US008589854B2

(12) United States Patent
Ng et al.

(10) Patent No.: US 8,589,854 B2
(45) Date of Patent: *Nov. 19, 2013

(54) APPLICATION DRIVEN POWER GATING

(75) Inventors: Pius Ng, Hillsboro, OR (US); Satish Padmanabhan, Sunnyvale, CA (US); Anand Pandurangan, Bangalore (IN); Ananth Durbha, San Jose, CA (US); Suresh Kadiyala, Cupertino, CA (US); Gary Oblock, Santa Clara, CA (US)

(73) Assignee: Algotochip Corp., Sunnyvale, CA (US)

( * ) Notice: Subject to any disclaimer, the term of this patent is extended or adjusted under 35 U.S.C. 154(b) by 690 days.

This patent is subject to a terminal disclaimer.

(21) Appl. No.: 12/835,628

(22) Filed: Jul. 13, 2010

(65) Prior Publication Data

US 2012/0017198 A1    Jan. 19, 2012

(51) Int. Cl.
*G06F 11/22* (2006.01)

(52) U.S. Cl.
USPC ........... 716/136; 713/320; 713/321; 716/126; 716/132

(58) Field of Classification Search
None
See application file for complete search history.

(56) References Cited

U.S. PATENT DOCUMENTS

| | | | | |
|---|---|---|---|---|
| 7,620,926 | B1 * | 11/2009 | Tuan | 716/138 |
| 7,627,838 | B2 * | 12/2009 | Keswick | 716/132 |
| 7,725,848 | B2 * | 5/2010 | Nebel et al. | 716/136 |
| 7,930,572 | B2 * | 4/2011 | Bonavita et al. | 713/320 |
| 7,966,345 | B1 * | 6/2011 | Funston | 707/793 |
| 7,984,412 | B1 * | 7/2011 | Schumacher et al. | 716/136 |
| 8,078,894 | B1 * | 12/2011 | Ogami | 713/321 |
| RE44,025 | E * | 2/2013 | Eisenstadt et al. | 716/126 |
| 2005/0204316 | A1 * | 9/2005 | Nebel et al. | 716/2 |
| 2007/0250800 | A1 * | 10/2007 | Keswick | 716/8 |
| 2009/0158061 | A1 * | 6/2009 | Schmitz et al. | 713/300 |
| 2010/0138811 | A1 * | 6/2010 | Jayaraman et al. | 717/125 |
| 2011/0041115 | A1 * | 2/2011 | Potkonjak | 716/136 |

OTHER PUBLICATIONS

Robert, Hasterlik, "RTL the Firmare Design Automation System", 1974, Honeywell Information Systems, Inc., pp. 284-299, <http://delivery.acm.org/10.1145/820000/811405/p284-hasterlik.pdf>.*

Aviral Shrivastava, "A Compiler-in-the-Loop Framework to Explore Horizontally Partitioned Cache Architectures", 2007, Arizona State University, pp. 328-333, <http://ieeexplore.ieee.org/stamp/stamp.jsp?tp=&arnumber=4483968>.*

Sergey Edward Lyshevski, "Integrated control of microactuators and integrated circuits: a new turning approach in MEMS technology", 1999, Purdue University at Indianapolis, pp. 2611-2616, <http://ieeexplore.ieee.org.stamp/stamp.jsp?tp=&arnumber=831322&tag=1>.*

(Continued)

*Primary Examiner* — Thuy Dao
*Assistant Examiner* — Khanh Dang
(74) *Attorney, Agent, or Firm* — Tran & Associates

(57) ABSTRACT

Systems and methods are disclosed to manage power in a custom integrated circuit (IC) design by receiving a specification of the custom integrated circuit including computer readable code and generating a profile of the computer readable code to determine instruction usage; automatically generating a processor architecture uniquely customized to the computer readable code, the processor architecture having one or more processing blocks and one or more power domains; determining when each processing block is needed based on the code profile and assigning each block to one of the power domains; and gating the power domains with power based on the code profile; and synthesizing the generated architecture into a computer readable description of the custom integrated circuit for semiconductor fabrication.

16 Claims, 5 Drawing Sheets

(56) References Cited

OTHER PUBLICATIONS

Nicky C. C. Lu, "Emerging technology and business solutions for system chips", 2004, Etron Technology, Hsinchu, Taiwan, pp. 25-31, <http://ieeexplore.ieee.org/stamp/stamp.jsp?tp=&arnumber=1332580>.*

Massoud Pedram, "Power minimization in IC design: principles and applications", 1996, University of Southern California, pp. 3-56, <http://delivery.acm.org/10.1145/230000/225877/p3-pedram.pdf?>.*

Mazhar Alidina, "Precomputation-based sequential logic optimization for low power", 1994, Dept. of Electr. Eng. & Comput. Sci., MIT, Cambridge, MA, USA, pp. 426-436, < http://ieeexplore.ieee.org/stamp/stamp.jsp?tp=&arnumber=335011>.*

* cited by examiner

APPLICATION DRIVEN POWER GATING

CROSS-REFERENCED APPLICATIONS

This application is related to commonly owned, concurrently filed application Ser. No. 12/835,603 entitled "AUTOMATIC OPTIMAL INTEGRATED CIRCUIT GENERATOR FROM ALGORITHMS AND SPECIFICATION", application Ser. No. 12/835,621 entitled "AUTOMATIC OPTIMAL INTEGRATED CIRCUIT GENERATOR FROM ALGORITHMS AND SPECIFICATION", application Ser. No. 12/835,628 entitled "APPLICATION DRIVEN POWER GATING", application Ser. No. 12/835,631 entitled "SYSTEM, ARCHITECTURE AND MICRO-ARCHITECTURE (SAMA) REPRESENTATION OF AN INTEGRATED CIRCUIT", and application Ser. No. 12/835,640 entitled "ARCHITECTURAL LEVEL POWER-AWARE OPTIMIZATION AND RISK MITIGATION", the contents of which are incorporated by reference.

BACKGROUND

The present invention relates to a method and apparatus for managing power consumption in an electronic circuit.

Energy efficient system design in portable, battery-operated electronic devices has become increasingly important since energy consumption dictates the battery lifetime of a portable system, and this is a crucial performance metric for the success of any product in the consumer market. Thus, power management is becoming an indispensable part of the system infrastructure.

Dynamic power management (DPM) is a design methodology that enables the dynamic configuration or reconfiguration of a system for energy or power efficient computation. DPM techniques typically involve switching off or 'slowing down' idle parts of the system, and dynamically trading system performance for energy efficiency. DPM techniques provide ways to optimize and control the system power by tuning the performance of the individual system components to the varying workload.

In systems with a dynamically varying workload, that is, in systems that do not have to deliver a peak or maximum performance all of the time, the voltage and clock frequency can be controlled to optimize the power consumption of the system. This is known as dynamic voltage and frequency scaling (DVFS). United States Patent Application 20070266268 discloses a single instruction multiple data (SIMD) processor architecture whose operation is controlled by a local clock signal having a first frequency; a control processor adapted to control the operation of the SIMD processor architecture and generate signals to synchronize the operation of the processor array with the stream of data vectors. The operation of the control processor is controlled by a local clock signal having a second frequency; and power management means for adjusting the frequencies of the local clock signals in response to the synchronization signals generated by the control processor, thereby minimizing the power consumption of the SIMD processor architecture. However, this approach only adjusts frequency, leaving devices that may operate at low frequency even when not needed by the application code.

The power consumed by a chip belongs to two main components: dynamic switching power, and static or leakage power. These components can be independently managed. Conventional power management techniques rely on circuit level techniques. As fabrication technology moves to smaller geometries, static power dissipation is becoming critical. Static or leakage power is independent of the activities of the IC. Thus, for battery-driven electronics such as mobile phones, reducing the leakage power is important.

SUMMARY

In one aspect, systems and methods are disclosed to manage power in a custom integrated circuit (IC) design by receiving a specification of the custom integrated circuit including computer readable code and generating a profile of the computer readable code to determine instruction usage; automatically generating a processor architecture uniquely customized to the computer readable code, the processor architecture having one or more processing blocks and one or more power domains; determining when each processing block is needed based on the code profile and assigning each block to one of the power domains; and gating the power domains with power based on the code profile; and synthesizing the generated architecture into a computer readable description of the custom integrated circuit for semiconductor fabrication.

Implementations of the above aspects can include one or more of the following. The system can generate functional block usage statistics from the profile. The system can track usage of different processing blocks as a function of time. The system can speculatively shut down power for one or more processing blocks and automatically switch power on for turned off processing blocks when needed. An instruction decoder can determine when power is to be applied to each power domain. Software tools for the custom IC to run the application code can be automatically generated. The tools include one or more of: Compiler, Assembler, Linker, Cycle-Based Simulator. The tool automatically generates firmware. The tools can profile the firmware and providing the firmware profile as feedback to optimizing the architecture. The instruction scheduler of the compiler can arrange the order of instructions, armed with this power optimization scheme, to maximize the benefit. The system can iteratively optimize the processor architecture based on predetermined physical constraints. The system can perform static profiling or dynamic profiling of the computer readable code. The system can automatically generate a software development kit (SDK) for the custom integrated circuit to run the computer readable code. The computer readable code can be transformed into assembly code and linked to generate firmware for the selected architecture. The system can perform cycle accurate simulation of the firmware. The architecture can be optimized based on profiled firmware and/or the assembly code. The system can generate register transfer level code for the selected architecture, and thus for a physical design optimized in terms of timing, area, or power. The system can synthesize the RTL code.

Advantages of the preferred embodiments may include one or more of the following. The static power can be controlled from an architectural perspective. This would let chip designers get a better handle on the power consumed upfront and also avoid power related schedule delays.

DESCRIPTION

Figure 1:
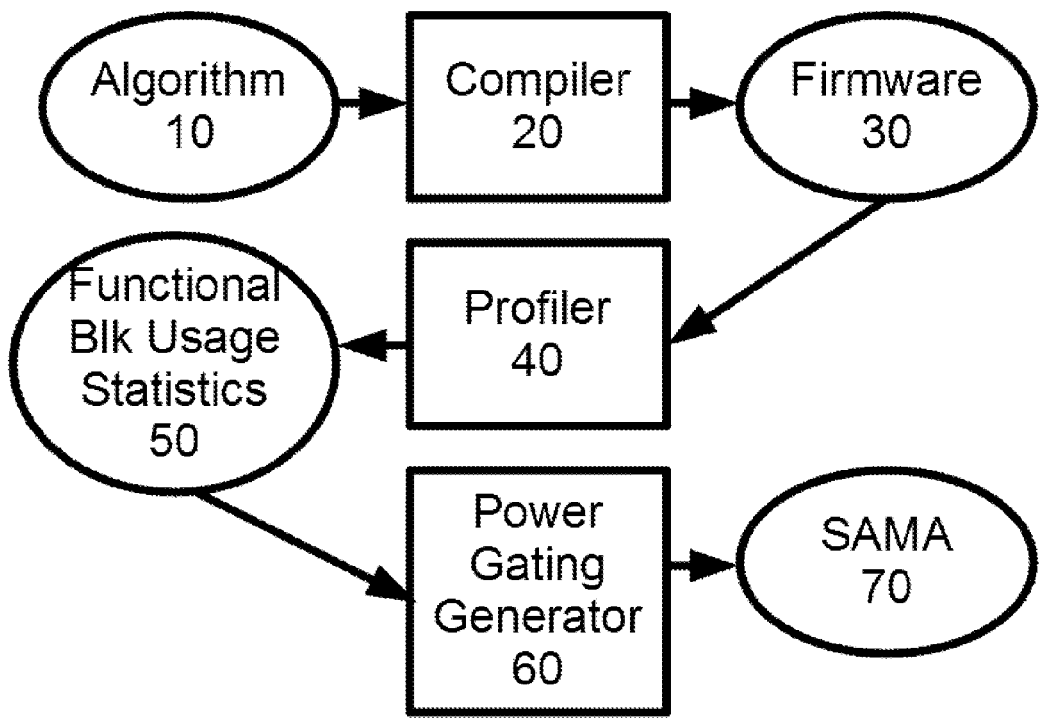
FIG. 1 shows an exemplary system to automatically manage power for an application specific integrated circuit (ASIC) automatically designed in response to an application code.

FIG. 1 shows an exemplary system to automatically manage power for an application specific integrated circuit (ASIC) automatically designed in response to an application code. In FIG. 1, application code or algorithm 10 is provided as input to the system. The application code is presented to a compiler 20 which generates firmware 30. The firmware 30 is analyzed by a profiler 40. The profiler output is provided to a functional block usage statistics module 50. The result is provided to a power gating generator 60, and the output of the power gating generator 60 is provided to a SAMA (system architecture and microarchitecture) block 70. The SAMA block 70 generates a high-level light weight abstract model that allows an architecture optimizer to optimize and generate new architecture described in SAMA block 70. The SAMA block 70 provides information to a Data Model (DM), which is an expanded unified functional and physical model of the ASIC. The DM receives physical primitive information of the ASIC such as adder, multiplier, for example. The profile of the firmware is fed back to the architecture optimizer to optimize the ASIC design based on predetermined physical constraints such as power, size, speed, among others. The DM can generate RTL code that conforms to the constraints to arrive at a physical design with timing, area, power feedback information provided to the architecture optimizer. The SAMA block 70 is described in more detail in the co-pending, commonly owned application filed concurrently herewith, the content of which is incorporated by reference.

The system of FIG. 1 minimizes static power consumption through power gating. Typically, the higher the supply voltage, the faster the transistor switches, the higher the power. Thus, performance can be tradeoff against power by controlling the voltage supply at different region of a device. Also, for certain logic which is not required, the system can isolate the power supply through power gate standard cells, or Power Gating. The system of FIG. 1 determines, based on the algorithm or code profile, when different sections of the chip could be unused for small time windows while other functionality is being used. For example in DSP chips it is possible that the ALU (Arithmetic Logic Unit) is not used while the MAC (multiply and accumulate unit) is used in a FIR filter. The power gating generator 60 can take advantage of the code behavior and shut down the power grid to the ALU logic in one particular example.

Figure 2:
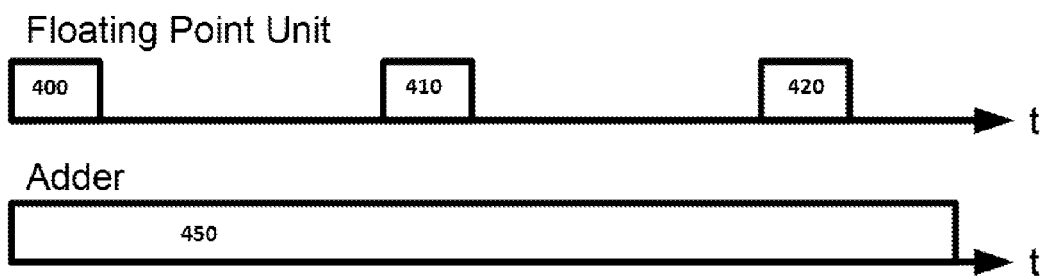
FIG. 2 shows an exemplary profile of various processor block usage.

FIG. 2 shows an exemplary profile of various processor block usage. This profile is used in providing power management to the system of FIG. 1. In this example, the code profile shows that a floating point unit (FPU) is sporadically used at periods 400, 410 and 420. The profile also shows that an adder is used during period 450 which is much longer than periods 400, 410 and 420. Based on the block usage statistics, the adder is not a candidate for a separate power domain since it is used so frequently, but a new power domain with power gating can be created for the FPU so that the CPU can be power gated down when during long idle periods to save energy.

Figure 3:
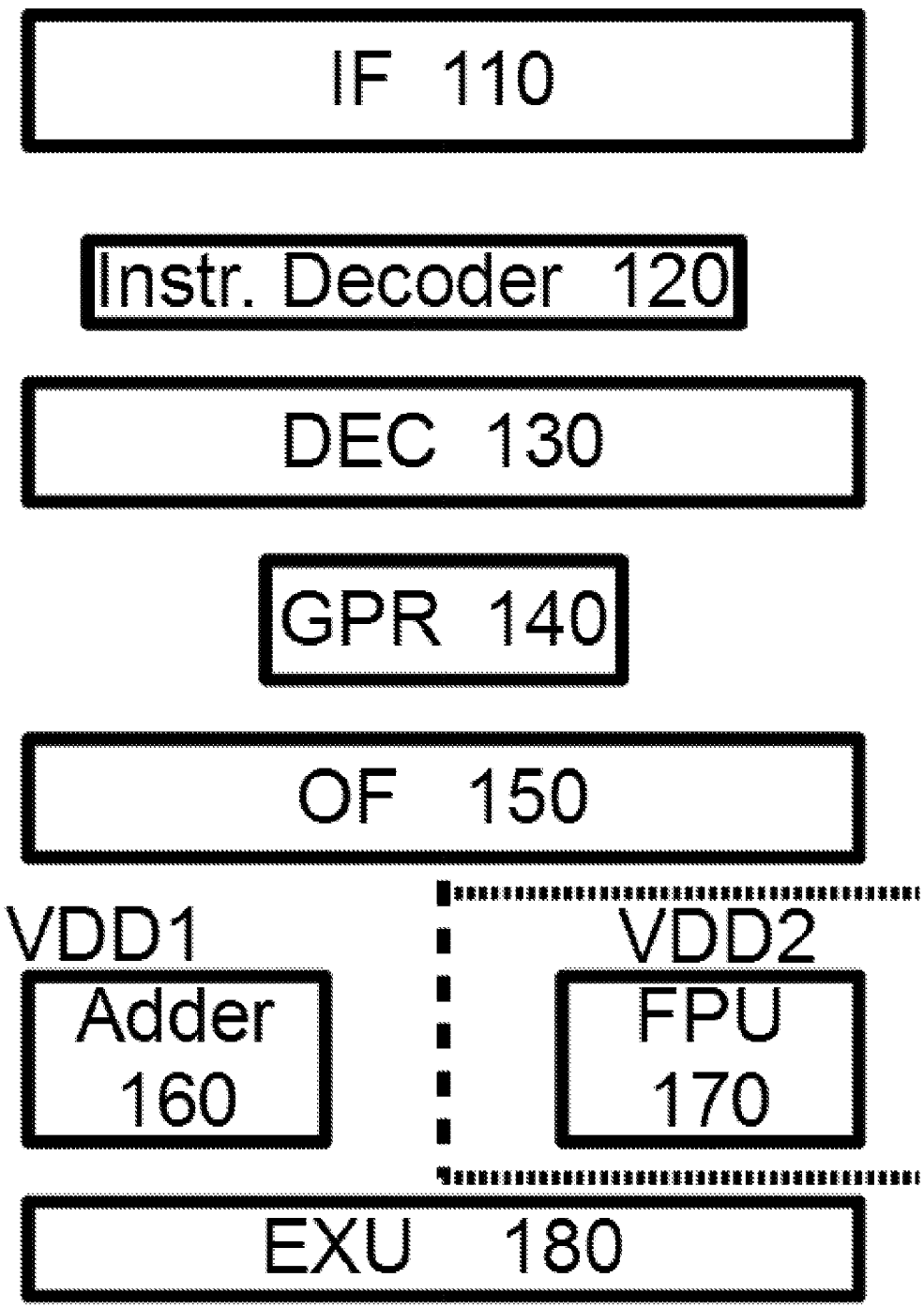
FIG. 3 shows an exemplary architecture custom generated for a particular application code or algorithm with the exemplary profile of FIG. 2.

FIG. 3 shows an exemplary architecture custom generated for a particular application code or algorithm with the exemplary profile of FIG. 2. In this architecture, an instruction fetch (IF) unit 110 provides instructions to an instruction decoder 120. The instruction is decoded by a decoder 130 and accesses various general purpose registers 140. An operand fetch unit 150 can fetch data from the registers or from memory. An adder 160 can do addition and subtraction, while a floating point unit (FPU) 170 can handle floating point arithmetic. An execution unit 180 can execute the instructions.

In the ICs being designed, portions of the device may have an always-on power supply and portions may have a controllable power supply that can be programmably shut off. On advantage is a significant reduction of leakage power as the differential between power and ground becomes nearly zero. Using knowledge of the specific needs of the algorithm, the system of FIG. 1 provides power gating to turn off the power supply to a certain portion of the IC completely. Also, the power turn on process is carefully sequenced to avoid the potential of "rush" current when a power-down circuit is being power-up. Further, driver-load pairs may exist in different voltage islands and their relationship are controlled to minimize spikes and other transients.

To allow power gating to work seamlessly, static power is controlled using architectural power features. In the past the power saving features in the chips have been restricted to basic modes like "idle", "sleep" and "halt" mode where various sections of the chips are powered down. But with the increasing performance requirement in new applications like the smart-phone, it is uncommon to have the chip be idle without activity. Thus, it is less common when these traditional power modes can be activated since some parts of the chip are active all the time.

In this example, based on the profile of FIG. 2, the architecture optimizer determines that the FPU will be assigned to its own power domain VDD2 while the rest of the blocks are powered from power domain VDD1. The system of FIG. 1 generates the power gating control bits automatically through the instruction decoder 120 in one embodiment. Based on the profile of the algorithm or code, the instruction decoder 120 generates a stream of power gating control bits that determine when a particular power domain is powered up or down.

Figure 4:
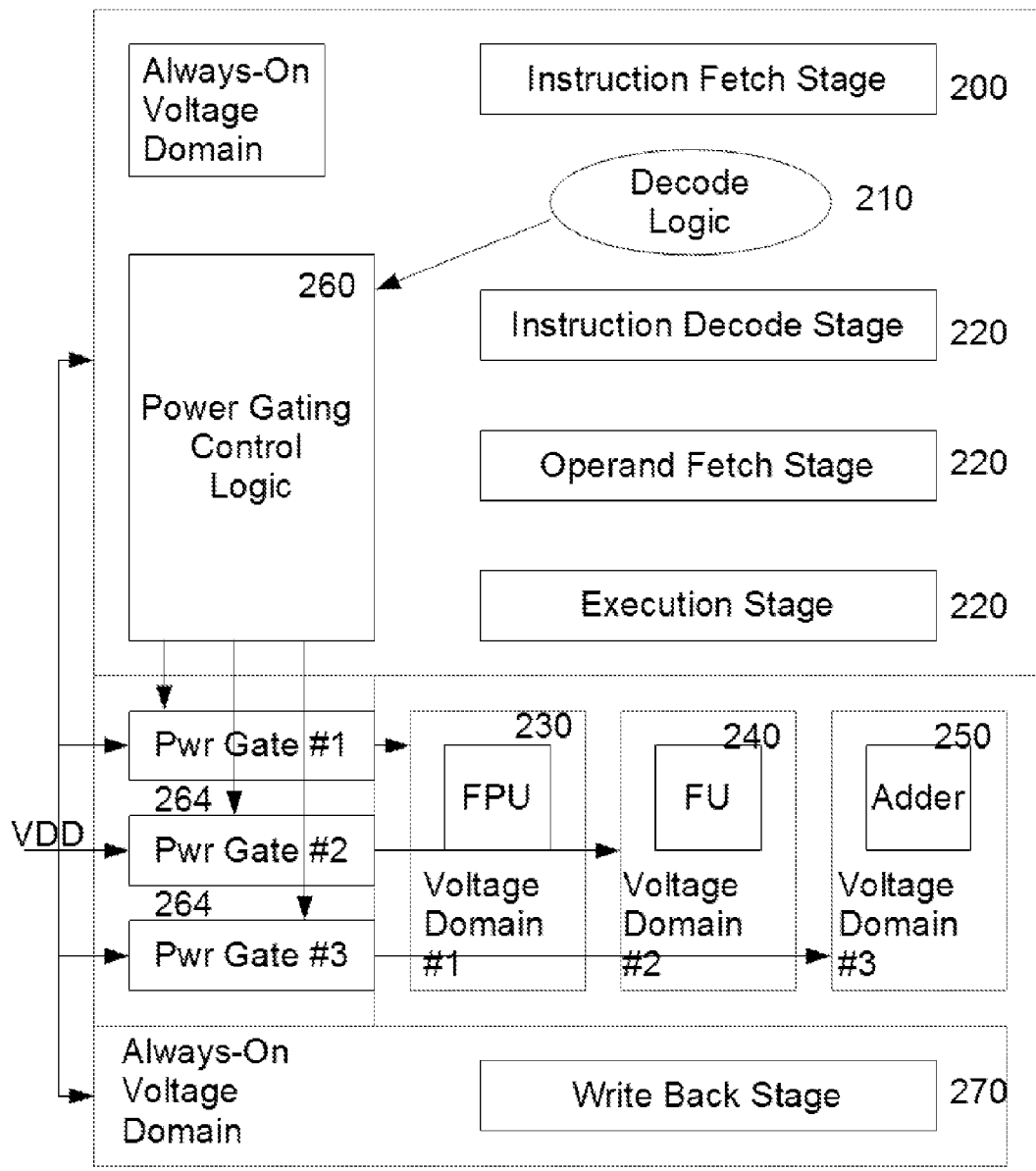
FIG. 4 shows an exemplary physical implementation of an exemplary processor architecture.

FIG. 4 shows an exemplary implementation of a processor architecture. In this embodiment, pipeline stages 200, 220 and 270 are provided. Combinatorial logic 210 can be positioned between pipeline stages 200 and 220, and static power is continuously drained from the logic 210. Nothing could be done to minimize the power consumption of combinatorial logic 210. However, for the FPU 230, multiplier 240, and adder 250, each can be on a separate power bus or domain, gated by an instruction decoder acting as a gating controller 260.

In the system of FIG. 4, each functional unit and threads of the hardware can have a separate power control system. This system is controlled by the instruction code and hence can be controlled dynamically. Also this information will be fed to the place and route methodology so that the different sections with the same power control mechanism can be placed and routed in such a way that a single power gating mechanism will switch the power off for that logic.

In one embodiment, the system intelligently tracks the usage of the different functional blocks as a function of time. It would speculatively shut down the power for different functional blocks. In case the program flow comes up with instructions that are going to need the usage of these functional blocks, the hardware would automatically switch the power on for these functional blocks. Hence, the programmer would not be involved in micro-managing the power control system, thus making the system easy to use.

FIG. 1 shows an exemplary system to automatically generate a custom IC. The system of FIG. 6 supports an automatic generation of an architecture with optimal instruction set using instruction set compression and variable width encoding for a programmable hardware solution for the chosen target application. The target application specification is usually done through algorithm expressed as computer readable code in a high-level language like C, Matlab, SystemC, Fortran, Ada, or any other language. The specification includes the description of the target application and also one or more constraints such as the desired cost, area, power, speed, performance and other attributes of the hardware solution.

Figure 5:
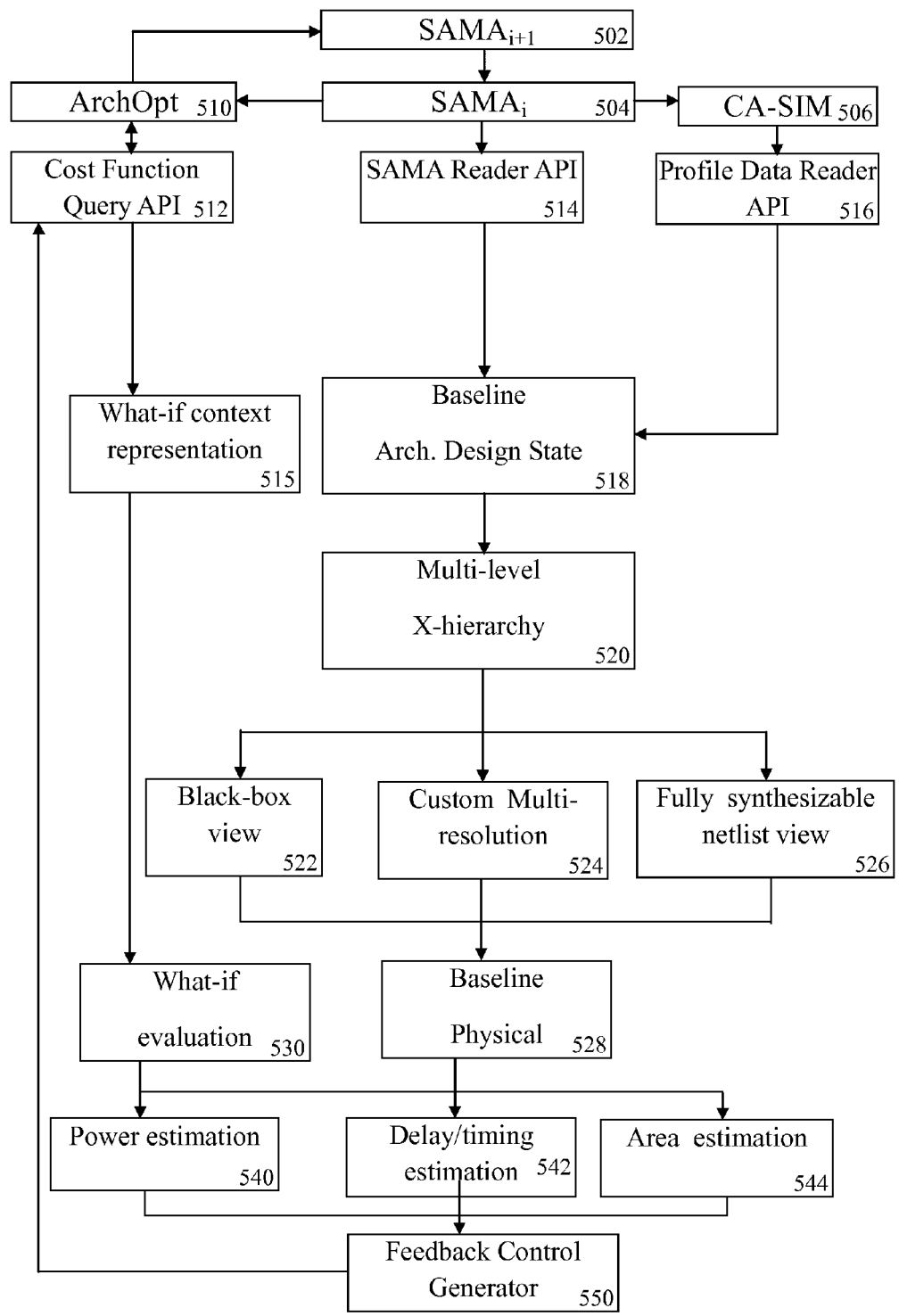
FIG. 5 shows an exemplary architecture-level What-if Incremental Cost Estimation Data Model (WICE-DM).

FIG. 5 shows the data flow for the physical design (PD) model based area, power and delay cost estimation for architecture and micro-architecture level incremental what-if analysis. Turning now to FIG. 5, after iteration i, the next SAMA i+1 is used as the input to the next iteration in 502. Thus, SAMA at time i is updated in 504. The SAMA in 504 is provided to CA simulator in 506 and the architecture optimizer 510. The AO 510 communicates through a cost function query API 512. The SAMA communicates through a SAMA reader API 514. The CAsim sends profile information through a profile data reader API 516.

The SAMA reader API 514 communicates architecture and synthesis information to an architecture design state (MAML-HG) 518. The cost function query API 512 provides information to an evaluation context management 515, which in turn provides information to the MAML-HG 518. The context management 515 can be used to form an evaluation context physical design model 530. The context management 515 keeps track of proposed design modifications from baseline. Many changes are proposed without commit during initial stages of cost evaluation. Committed context becomes part of baseline design (SAMA file update).

The MAML-HG 518 provides a multi-level hypergraph data structure to a multi-level X-hierarchy manager 520. The manager 520 in turn provides various views including a black-box view 522, a custom multi-resolution hierarchical view 524, and a fully synthesizable netlist view 526, among others. The views 522-526 can be used to form a baseline physical design model 528.

The models 528-530 can be used to by a power hot-spots estimation engine 540, a delay and timing estimation engine 542, and an area estimation engine 544, among others. The power hot-spot estimation engine 540 can receive estimated activity factors (AFs) from the MAML-HG 518. Data from engines 540-544 are provided to an analytical information manager 550, which provides feedback to the AO 510 via the cost function query API 512.

One exemplary API is discussed in more details below.

---

Cost Function Estimation (CFE) API.
   boolean define_contextcontext_name {change_list}
   boolean set_active_context context_name
   response_type compute_delay {path|whole_chip}
   response_type compute_area component
   boolean commit_context context_name -outfileName sama_i.txt

---

The 'response type' includes following information
   relative cost (delay, area, power etc depending on the actual query)
      qualitative (improve, no significant impact, degrade)
      quantitative (a heuristic measure of the qualitative change)
   Conditional cost with supplementary physical design optimization (SPDO)
      supplementary PD optimization ID (internal book-keeping ID for future reference)
      new relative cost if WA is accepted.
   Confidence interval
      A value between 0 and 1
      1 means cost was computed with most accurate data driven tool flow
      0 means cost was estimated roughly and is very likely to be significantly different if a detailed cost analysis is performed.

The ability to provide a supplementary optimization proposal (indexed by an ID) elevates physical design optimization to influence the AO when architecture optimizations are still being considered and not finalized. In standard industry flows, physical design optimizations are not done until architecture optimization has been completed. The system allows the AO to choose an optimization that physical synthesis thinks is possible but without requiring the AO to understand the details of how this optimization should be accomplished. The data model then configures the physical synthesis appropriately for actual implementation. This mechanism enables AO to consider far-reaching consequences of an optimization move and not just the immediately computed cost function and thus enable better design convergence.

Another exemplary API is the path activity profile as follows:

---

Path Profile (PP) API
   set_path_likelihood path activity_factor

---

Path activity factor is a probability or likelihood that the path gets exercised. This information is available from a cycle-accurate-simulator (see Illustration 1 on page 1). WICE-DM integrates this information with the path topology information obtained from physical design modeling. As a result, it generates a power utilization estimate for each unit area of the physical design. This then provides the power hot-spot information which can then be provided as a feedback to an instruction scheduler in the form of a resource constraint. The net effect of this feedback is that (a) instructions are scheduled such that potential timing and other signal integrity issues are avoided and (b) components that need to be power hot-spot neighborhoods can be retrofitted with power islanding, clock gating or other techniques and the area/timing cost of such improvisations will be available immediately.

In one embodiment of FIG. 5, architecture level knowledge is encoded into a netlist file in to pass information that is not normally available to physical synthesis. For example, hierarchy names may contain pre and post fix tags to indicate if the grouping of cells in that hierarchy is a hard or soft constraint. This information is useful for making more aggressive decisions in physical partitioning that result in improving tool chain capacity resulting in faster turn-around time. The names of instances may also contain certain pre/post fix to indicate if architecture level model sees this as a likely pathway for real critical path. Physical synthesis can "lookahead" to real critical paths rather than chipping away at wrong ones until right one is discovered. This eliminates unwanted optimization (over-optimization leading to other cost increase) and save turn-around time. As another example, certain macro blocks may be named to indicate placement constraints (such as array placement, among others) that helps achieve optimal timing first time around. In addition to encoding "side-band" information to the netlist file, the flow of FIG. 5 is also able to generate design constraints (physical as well timing) that are more productive in guiding the physical synthesis than original user constraints alone can. In some cases such constraints are "implied" thru a netlist instance naming scheme.

Figure 6:
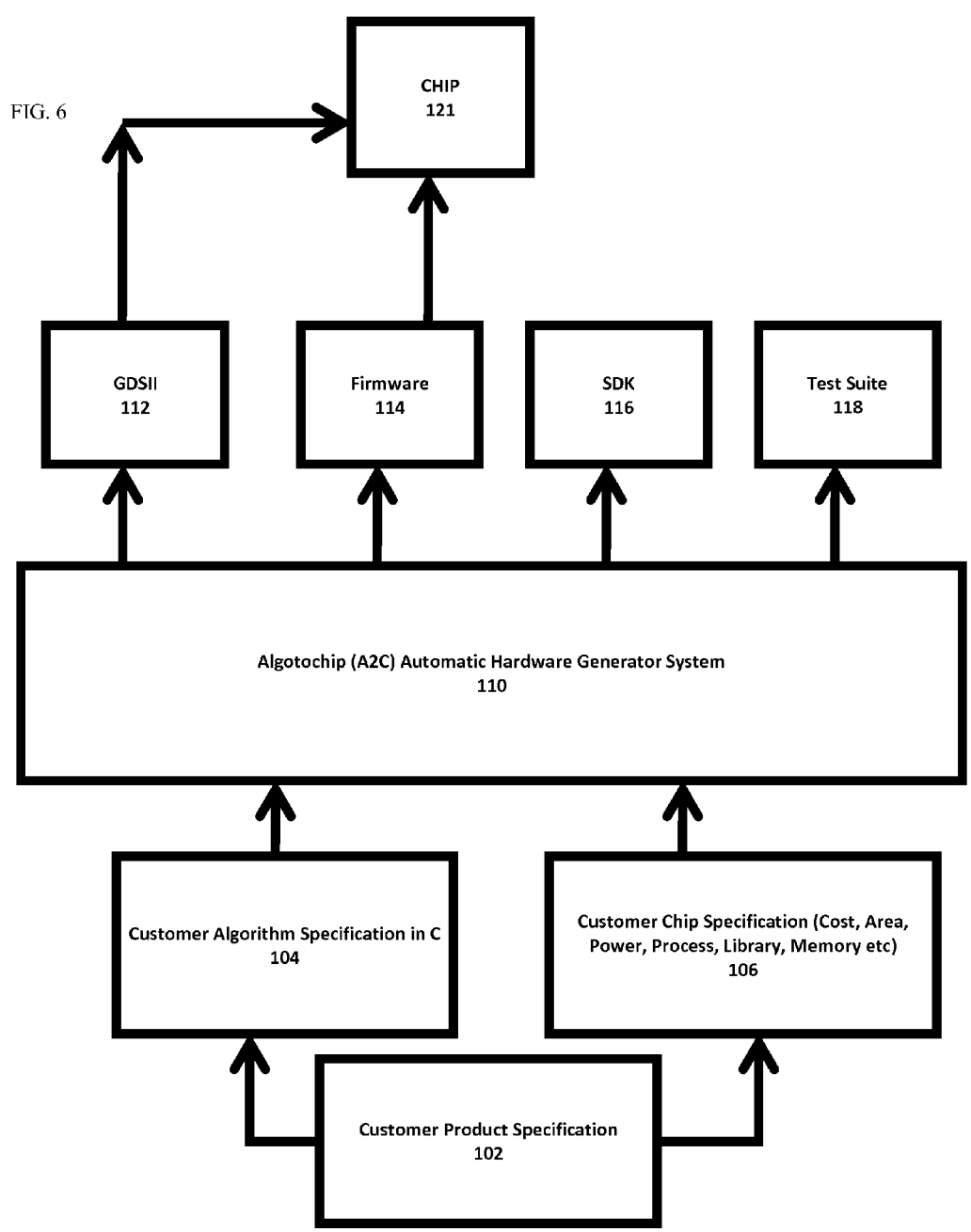
FIG. 6 shows an exemplary system to automatically generate a custom IC with architecture based power management.

In FIG. 6, an IC customer generates a product specification 102. Typically there is an initial product specification that captures all the main functionality of a desired product. From the product, algorithm experts identify the computer readable code or algorithms that are needed for the product. Some of these algorithms might be available as IP from third parties or from standard development committees. Some of them have to be developed as part of the product development. In this manner, the product specification 102 is further detailed in a computer readable code or algorithm 104 that can be expressed as a program such as C program or a math model such as a Mathlab model, among others. The product specification 102 also contains requirements 106 such as cost, area, power, process type, library, and memory type, among others.

The computer readable code or algorithm 104 and requirement 106 are provided to an automated IC generator 110. Based only on the code or algorithm 104 and the constraints placed on the chip design, the IC generator 110 automatically generates with few or no human involvement an output that includes a GDS file 112, firmware 114 to run the IC, a software development kit (SDK) 116, and/or a test suite 118. The GDS file 112 and firmware 114 are used to fabricate a custom chip 121.

The instant system alleviates the issues of chip design and makes it a simple process. The system shifts the focus of product development process back from the hardware implementation process back to product specification and algorithm design. Instead of being tied down to specific hardware choices, the algorithm can always be implemented on a processor that is optimized specifically for that application. The system generates this optimized processor automatically along with all the associated software tools and firmware applications. This whole process can be done in a matter of days instead of years that it takes now. In a nutshell the system makes the digital chip design portion of the product development in to a black box.

In one embodiment, the instant system product can take as input the following:
Computer readable code or algorithm defined in C/Matlab
Peripherals required
Area Target
Power Target
Margin Target (how much overhead to build in for future firmware updates and increases in complexity)
Process Choice
Standard Cell library Choice
Testability scan The output of the system may be a Digital Hard macro along with all the associated firmware. A software development kit (SDK) optimized for this Digital Hard macro is also automatically generated so that future upgrades to firmware are implemented without having to change the processor.

The system performs automatic generation of the complete and optimal hardware solution for any chosen target application. While the common target applications are in the embedded applications space they are not necessarily restricted to that.

By way of example, a computer to support the automated chip design system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to manage power in a custom integrated circuit (IC) design, comprising:
   a. receiving a specification of the custom integrated circuit including computer readable code and generating a profile of the computer readable code to determine instruction usage;
   b. automatically generating an application specific instruction set processor architecture uniquely customized to the computer readable code with a compiler-in-the-loop (CIL) to compile, assemble and link code for each processor architecture iteration, the processor architecture generated by the CIL having one or more processing blocks and one or more power domains;
   c. generating functional block usage statistics from the profile and tracking usage of different processing blocks as a function of time;
   d. determining when each processing block is needed based on the code profile and assigning each block to one of the power domains; and
   e. gating the power domains with power based on the code profile; and f. identifying from the generated iterations the optimal architecture and synthesizing the optimal architecture into a computer readable description of the custom integrated circuit for semiconductor fabrication.

2. The method of claim 1, comprising speculatively shutting down power for one or more processing blocks and automatically switching power on for turned off processing blocks when needed.

3. The method of claim 1, comprising using an instruction decoder to determine when power is to be applied to each power domain.

4. The method of claim 1, comprising performing static profiling or dynamic profiling of the computer readable code to determine processing block usage.

5. The method of claim 1, comprising automatically generating firmware or software development kit (SDK) for the custom integrated circuit to run the computer readable code.

6. The method of claim 1, comprising compiling the computer readable code into assembly code.

7. The method of claim 6, comprising linking the assembly code to generate firmware for the selected architecture.

8. The method of claim 6, comprising performing cycle-based simulation of the firmware.

9. The method of claim 6, comprising performing dynamic profiling of the firmware.

10. The method of claim 9, comprising optimizing the architecture based on profiled firmware.

11. The method of claim 6, comprising optimizing the architecture based on the assembly code.

12. The method of claim 1, comprising generating register transfer level code for the selected architecture.

13. The method of claim 9, comprising performing synthesis of the RTL code.

14. A system having a processor to automatically manage power in a custom integrated circuit (IC) design, comprising:
   a. means for receiving a specification of the custom integrated circuit including computer readable code and generating a profile of the computer readable code to determine instruction usage;
   b. means for automatically generating an application specific instruction set processor architecture uniquely customized to the computer readable code with a compiler-in-the-loop to compile, assemble and link code for each processor architecture iteration, the processor architecture generated by the CIL having one or more processing blocks and one or more power domains;
   c. means for generating functional block usage statistics from the profile and tracking usage of different processing blocks as a function of time;
   d. means for determining when each processing block is needed based on the code profile and assigning each block to one of the power domains; and
   e. means for gating the power domains with power based on the code profile; and
   f. means for identifying from the generated iterations the optimal architecture and synthesizing the optimal architecture into a computer readable description of the custom integrated circuit for semiconductor fabrication.

15. The system of claim 14, comprising means for speculatively shutting down power for one or more processing blocks and automatically switching power on for turned off processing blocks when needed.

16. The system of claim 14, comprising an instruction decoder to determine when power is to be applied to each power domain.

* * * * *